US009983358B2

(12) United States Patent
Lu et al.

(10) Patent No.: US 9,983,358 B2
(45) Date of Patent: May 29, 2018

(54) APPARATUS AND METHOD FOR OPTICAL TIME DOMAIN REFLECTOMETRY

(71) Applicant: Go!Foton Holdings, Inc., Somerset, NJ (US)

(72) Inventors: Haiguang Lu, Los Altos, CA (US); Kenichiro Takeuchi, North Brunswick, NJ (US); Rhaniel Peralta, Calamba (PH); Glenn Lachica, Laguna (PH); Marlene Gizelle M. Balinos, Batangas (PH); Anita L. Lumantes, Laguna (PH); Erika Mae A. Entico, Laguna (PH)

(73) Assignee: Go!Foton Holdings, Inc., Somerset, NJ (US)

( * ) Notice: Subject to any disclaimer, the term of this patent is extended or adjusted under 35 U.S.C. 154(b) by 0 days. days.

(21) Appl. No.: 15/794,399

(22) Filed: Oct. 26, 2017

(65) Prior Publication Data
US 2018/0045890 A1 Feb. 15, 2018

Related U.S. Application Data

(62) Division of application No. 14/873,594, filed on Oct. 2, 2015, now Pat. No. 9,846,279.

(60) Provisional application No. 62/060,541, filed on Oct. 6, 2014.

(51) Int. Cl.
G02B 6/26 (2006.01)
G02B 6/293 (2006.01)
H04J 14/02 (2006.01)
G02B 6/42 (2006.01)

(52) U.S. Cl.
CPC .......... *G02B 6/2937* (2013.01); *G02B 6/4246* (2013.01); *H04J 14/02* (2013.01)

(58) Field of Classification Search
None
See application file for complete search history.

(56) References Cited

U.S. PATENT DOCUMENTS 5,818,986 A * 10/1998 Asawa ............... G02B 6/12007
385/24
6,141,089 A * 10/2000 Thoma ............... G01M 11/3109
356/73.1

(Continued)

*Primary Examiner* — Chris Chu
(74) *Attorney, Agent, or Firm* — Lerner, David, Littenberg, Krumholz & Mentlik, LLP

(57) ABSTRACT

An optical signal routing device may include a first lens, second lens and a wavelength division multiplexer ("WDM") filter positioned between the first and second lenses. The WDM filter may reflect a signal of a first wavelength with a first attenuation and pass the first wavelength signal attenuated by at most a second attenuation to the second lens, the first attenuation exceeding the second attenuation by a first predetermined amount. The WDM filter may reflect a signal of a second wavelength different than the first wavelength with at most a third attenuation, the first attenuation exceeding the third attenuation by at least a second predetermined amount. The device may further include a reflector positioned to reflect the first wavelength signal reflected by the WDM filter toward the WDM filter with at least a fourth attenuation, the fourth attenuation exceeding the second attenuation by at least a third predetermined amount.

9 Claims, 11 Drawing Sheets

(56) References Cited

U.S. PATENT DOCUMENTS

| | | | |
|---|---|---|---|
| 6,456,634 B1* | 9/2002 | Cremer | G01M 11/319 356/73.1 |
| 6,473,540 B1* | 10/2002 | Augustsson | G02B 6/2931 385/15 |
| 6,534,997 B1 | 3/2003 | Horishita et al. | |
| 6,630,992 B1* | 10/2003 | Vobian | H04B 10/071 356/73.1 |
| 6,842,562 B2 | 1/2005 | Kinoshita et al. | |
| 7,343,094 B2 | 3/2008 | Kawahata | |
| 2004/0017973 A1* | 1/2004 | Aritake | G02B 6/12007 385/40 |
| 2004/0033014 A1 | 2/2004 | Sasaki et al. | |
| 2015/0263819 A1* | 9/2015 | Fincato | H04J 14/02 398/43 |

\* cited by examiner

APPARATUS AND METHOD FOR OPTICAL TIME DOMAIN REFLECTOMETRY

CROSS-REFERENCE TO RELATED APPLICATIONS

The present application is a divisional of U.S. patent application Ser. No. 14/873,594, filed on Oct. 2, 2015, which claims the benefit of the filing date of U.S. Provisional Patent Application No. 62/060,541 filed Oct. 6, 2014, the disclosures of which are both hereby incorporated by reference herein.

BACKGROUND

In optical transmission systems, cables, such as fiber-optic cables, are used to transmit information. In some systems, such as that shown in FIG. 1, cables 15 and 15a-d extend from an optical line terminal ("OLT") 10 to one or more optical network units ("ONUs") 20a-d. An optical signal(s) of a certain wavelength or group of wavelengths, indicated in the figure as $\lambda i$, is transmitted downstream (downstream signal) from the OLT 10 to the ONUs 20a-d via the cables 15 and 15a-d. An optical signal of a certain wavelength or group of wavelengths, indicated in the figures as $\lambda j$, is transmitted upstream (upstream signal) from the ONUs 20a-d to the OLT 10.

If damage occurs to one or more of the cables 15 and 15a-d, for example a break in a cable from inclement weather, rodents or otherwise, it may be desirable to determine the location of the fault (or break) along the cable, such that the cable may be repaired.

One way to determine the location of the break in the cable is shown in FIG. 2. An optical time-domain reflectometer ("OTDR") 30 is installed coupled to the portion of the optical fiber cable 15 located near the OLT 10, and an OTDR signal reflector 40a-d is installed coupled to the portion of the optical fiber cable 15a-d located near each ONU 20a-d. An optical signal of a certain wavelength or group of wavelengths, indicated in the figure as $\lambda k$, is sent downstream along the cables 15 and 15a-d to the ONUs 20a-d from the OTDR 30, and the OTDR signal reflectors 40a-d are configured to reflect the $\lambda k$ signal upstream toward the OLT 10, such that the reflected signal $\lambda k$ may be detected by the OTDR 30. If a break or fault occurs in the cable upstream of the OTDR reflector 40a-d, and downstream of the point at which the cable 15 extending from the OLT 10 is joined with individual optical cables 15a-d extending respectively to the ONUs 20a-d, the $\lambda k$ signal will not be reflected back to the OTDR 30 by the OTDR reflector 40a-d, which is downstream of the break. The distance between the OTDR 30 and each OTDR signal reflector 40a-d is very accurately known and stored in a database, such that based upon the information of the distance associated with each OTDR reflector 40a-d and the lack of a reflected $\lambda k$ signal from a particular OTDR signal reflector 40a-d associated with a corresponding ONU 20a-d, it may be possible to determine in which cable 15a-d between an ONU 20a-d and the point at which the multiple cables 15a-d extending to the respective ONUs 20a-d are joined to the single cable 15 extending from the OLT 10 the fault is located.

Examples of known OTDR signal reflectors 40a-d are shown in FIGS. 3 and 4. For example, in FIG. 3 an OTDR signal reflector 40a is shown as a Bragg grating 41a in an optical fiber cable 15a. In FIG. 4, an OTDR signal reflector 40a is shown as a thin film wavelength division multiplexer ("WDM") filter 42a. Each OTDR signal reflector 40a is designed to allow $\lambda i$ and $\lambda j$ signals to pass therethrough with no or minimal attenuation, such that the $\lambda i$ and $\lambda j$ signals are transmitted between the OTL 10 and ONUs 20a-d with no or minimal degradation or power loss, while almost completely or completely reflecting the $\lambda k$ signals with minimal attenuation. However, in practice, some portion of the $\lambda i$ and $\lambda j$ signals incident on the OTDR signal reflector 40a-d is reflected. In particular, the reflection of the $\lambda i$ signals upstream toward the OTDR 30 is undesirable because such reflected $\lambda i$ signals may cause crosstalk or interference.

Therefore, it would be desirable, when performing OTDR in an optical network to detect cable faults or breaks, to provide a device that maximizes reflection of the $\lambda k$ signal while minimizing any reflection of other signals, such as the $\lambda i$ and/or $\lambda j$ signals, thereby increasing the accuracy with which an OTDR may help determine the particular location of a fault in an optical fiber cable of the optical network.

BRIEF SUMMARY

According to a first embodiment of the disclosure, an optical signal routing device may include a first lens positioned for receiving an optical signal, a second lens, and a wavelength division multiplexer ("WDM") filter positioned between the first and second lenses. The WDM filter may be configured to reflect a signal of a first wavelength with at least a first attenuation, for example about 15 dB, and pass the signal of the first wavelength attenuated by at most a second attenuation, for example about 1 dB, to the second lens. The first attenuation may exceed the second attenuation by at least a first predetermined amount. The WDM filter may be further configured to reflect a signal of a second wavelength different than the first wavelength with at most a third attenuation, for example about 1 dB. The first attenuation may exceed the third attenuation by at least a second predetermined amount. A reflector may be positioned to reflect the signal of the first wavelength reflected by the WDM filter toward the WDM filter with at least a fourth attenuation, for example about 15 dB. The fourth attenuation exceeding the second attenuation by at least a third predetermined amount.

The reflector may be a mirror configured to reflect the signal of the second wavelength toward the WDM filter with at most a fifth attenuation, for example about 3 dB. The reflector may alternately be a wavelength selective reflector. The first attenuation may exceed the fifth attenuation by at least a fourth predetermined amount. An optical filter may be positioned between the WDM filter and the reflector. The optical filter may be configured to pass the signal of the second wavelength attenuated by at most a sixth attenuation, for example about 1 dB, and to pass the signal of the first wavelength attenuated by at least a seventh attenuation, for example about 15 dB. The first attenuation may exceed the sixth attenuation by at least a fifth predetermined amount, and the seventh attenuation may exceed the second attenuation by at least a sixth predetermined amount.

According to a further embodiment of the disclosure, an optical signal routing device includes a lens positioned for receiving an optical signal, a wavelength division multiplexer ("WDM") filter, and a reflector. The WDM filter may be positioned between the lens and the reflector. The WDM filter may be configured to pass a signal of a first wavelength attenuated by at most a first attenuation, for example about 1 dB, and to pass a signal of a second wavelength attenuated by at least a second attenuation, for example about 15 dB. The second attenuation may exceed the first attenuation by a first predetermined amount. The reflector may be configured to reflect the signal of the first wavelength toward the WDM filter with an attenuation of not more than a third attenuation, for example about 3 dB. The second attenuation may exceed the third attenuation by a second predetermined amount. A first optical path may extend through the lens to the reflector, and a second optical path may extend from the WDM filter toward and through the lens, the first optical path being different from the second optical path.

The reflector may be a mirror configured to reflect the signal of the second wavelength toward the WDM filter with an attenuation of not more than the third attenuation, for example about 1 dB. An optical filter may be positioned adjacent the lens. The optical filter may be configured to pass the signal of the second wavelength attenuated by not more than a fourth attenuation, for example about 1 dB, and to pass the signal of the first wavelength attenuated by at least a fifth attenuation, for example about 15 dB. The fifth attenuation may exceed the fourth attenuation by a third predetermined amount.

Alternately, the reflector may be a wavelength selective reflector and configured to reflect the signal of the second wavelength with at least a fourth attenuation, for example about 15 dB, wherein the fourth attenuation exceeds the first attenuation by a third predetermined amount. An optical filter may be positioned adjacent the lens. The optical filter may be configured to pass the signal of the second wavelength attenuated by not more than a fifth attenuation, for example about 1 dB, and to pass the signal of the first wavelength attenuated by at least a sixth attenuation, for example about 15 dB. The sixth attenuation exceeds the fifth attenuation by a fourth predetermined amount.

According to a further embodiment of the disclosure, an optical signal routing device may include a first lens positioned for receiving an optical signal, a second lens, and a wavelength division multiplexer ("WDM") filter positioned between the first and second lenses. The WDM filter may be configured to pass, to the second lens, a signal of a first wavelength attenuated by at most a first attenuation, for example about 1 dB, and a signal of a second wavelength attenuated by at least a second attenuation, for example about 15 dB. The second attenuation may exceed the first attenuation by a first predetermined amount. A reflector may be positioned to reflect the signal of the first wavelength, passed by the WDM filter to the second lens, toward the WDM filter with not more than a third attenuation, for example about 3 dB. The second attenuation may exceed the third attenuation by a second predetermined amount. A first optical path may extend through the first and second lenses to the reflector, and a second optical path may extend from the WDM filter toward and through the first lens, the first optical path being different from the second optical path.

The reflector may be a mirror configured to reflect the signal of the second wavelength toward the WDM filter with an attenuation of not more than the third attenuation, for example about 3 dB. An optical filter may be positioned adjacent the first lens. The optical filter may be configured to pass the signal of the first wavelength from the WDM filter attenuated by at least a fourth attenuation, for example about 15 dB, and to pass the signal of the second wavelength reflected from the WDM filter attenuated by less than a fifth attenuation, for example about 1 dB. The fourth attenuation may exceed the fifth attenuation by a third predetermined amount.

Alternately, the reflector may be a wavelength selective reflector and configured to reflect the signal of the second wavelength passed by the WDM filter by at least a fourth attenuation, for example about 15 dB. The fourth attenuation may exceed the first attenuation by a third predetermined amount. An optical filter may be positioned adjacent the first lens, the optical filter configured to pass the signal of the first wavelength from the WDM filter attenuated by at least a fifth attenuation, for example about 15 dB, and to pass the signal of the second wavelength reflected from the WDM filter attenuated by less than a sixth attenuation, for example about 1 dB. The fifth attenuation may exceed the sixth attenuation by a fourth predetermined amount.

DETAILED DESCRIPTION

Figure 5:
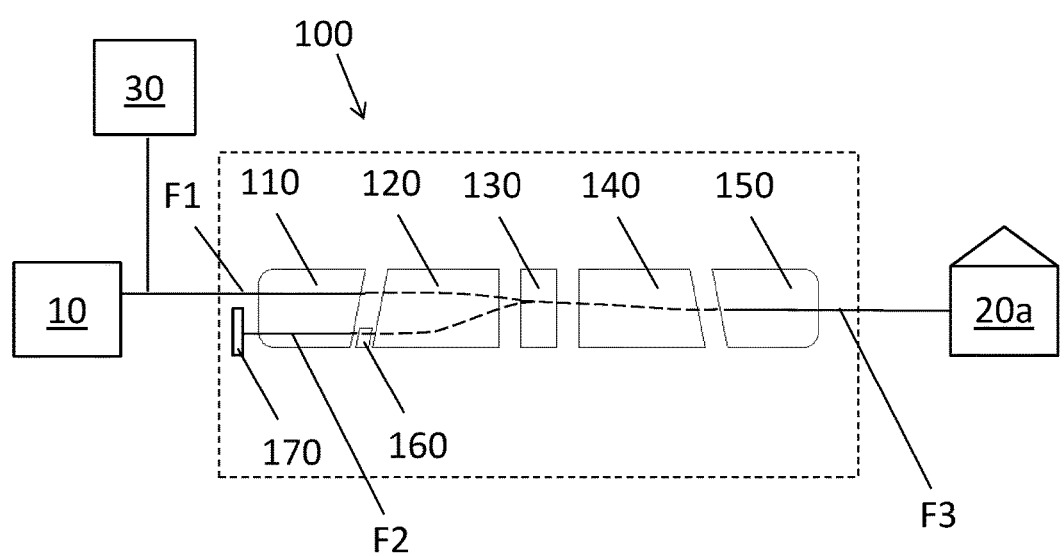
FIG. 5 is a schematic view of a system according to one embodiment of the invention.

FIG. 5 shows a schematic view of a system according to an embodiment of the disclosure. This embodiment may be generally similar to the overall setup described above in connection with FIG. 2, and further includes a device 100 arranged in an optical path extending from the OLT 10 to the ONU 20a-d. The device 100 may include a first mechanical connection 110 (e.g. a ferrule), a first lens 120, a wavelength division multiplexing (WDM) filter 130, a second lens 140, and a second mechanical connection 150, arranged in sequence, such that an optical signal $\lambda i$ entering the device 100 via optical fiber F1 at the first mechanical connection 110 passes through the first lens 120, the WDM filter 130 and the second lens 140 then exits through optical fiber F3 at the second mechanical connection 150 to continue toward the ONU 20a-d, along the optical path, with very minimal attenuation. The device 100 may further include a wavelength selective reflector (mirror) 170 arranged in relation to the first lens 110, an optical second filter 160 and the WDM filter 130, such that a second optical path extends from the reflector 170, through the optical second filter 160 via optical fiber F2, through the first lens 120 and to the WDM filter 130. The optical signal transmission and reflection characteristics of the WDM filter 130 and the selective reflector 170 may provide that $\lambda i$ signals from the OLT 10 are reflected by the WDM filter 130 with attenuation of about 15 dB toward the selective reflector 170, which then reflects the reflected $\lambda i$ signals with additional attenuation of about 15 dB to the WDM filter 130, which then may reflect the $\lambda i$ signals reflected from the reflector 170 upstream, out of the device 100, toward the OLT 10 with further attenuation of about 15 dB. In addition, the optical signal transmission and reflection characteristics of the WDM filter 130 and the selective reflector 170 may provide that λk signals from the OLT 10 are reflected by the WDM filter 130 with minimal attenuation, e.g. about 1 dB, toward the selective reflector 170, which then reflects the reflected λk signals with minimal attenuation toward the WDM filter 130, which then may reflect the λk signals reflected from the reflector 170 upstream, out of the device 100, toward the OLT 10 with minimal attenuation. It is noted that the optional second filter 160 may further significantly attenuate, e.g., by about 15 dB, the λi signals passing therethrough, while only minimally attenuating, e.g., by about 1 dB, the λk signals that pass therethrough. The characteristics of optical filter 160 may be similar or identical to those shown in the graphs of FIG. 9.

Accordingly, in the embodiment described in connection with FIG. 5, in the device 100, the WDM filter(s) 130 passes λi and λj signals with minimal loss, but provides that any portion of the λi and λj signals that is reflected is significantly attenuated (e.g., 15 dB). The wavelength selective reflector 170 allows reflectance of the λk signal without much loss and reflects the λi signal with substantial attenuation. Therefore, the signal reflected to the WDM filter 130 from the wavelength selective reflector 170 includes the λk signal, which has been minimally attenuated, and the λi signal that has been substantially attenuated, e.g., by about 30 dB, before the reflected λi signal is further attenuated (15 dB) when reflected by the WDM 130 filter to exit the device 100 towards the OTDR 30. In this embodiment, in the second optical path, the λi signal is substantially attenuated at least 3 times, whereas the λk signal experiences minimal attenuation. The λk signal may be further isolated with respect to the λi signal in the second optical path with the use of the optional second filter 160 described above and shown, or with further optional filters.

It should be understood that, although described as a wavelength selective reflector, the wavelength selective reflector 170 may be a simple mirror reflecting all wavelengths. In this case, although the λk signal will not be attenuated differently from the λi signal when reflected by the simple mirror, the other elements in the second path of the device 100 may provide sufficient selective attenuation of the λi signal so that a signal exiting the device 100 at the fiber F3 and detected by the OTDR 30 includes the λk signal which is still highly isolated from other signals in the signal exiting the device 100 at the connector 110.

Figure 6:
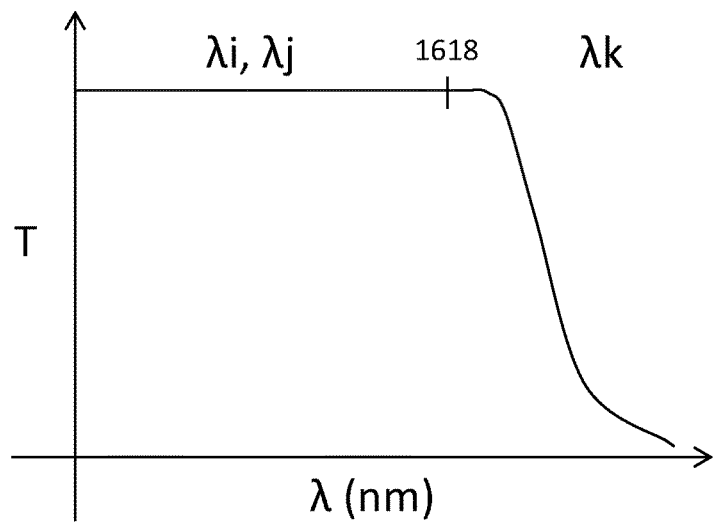
FIG. 6 shows graphs of characteristics of a WDM filter that may be used with the system of FIG. 5.
Figure 6:
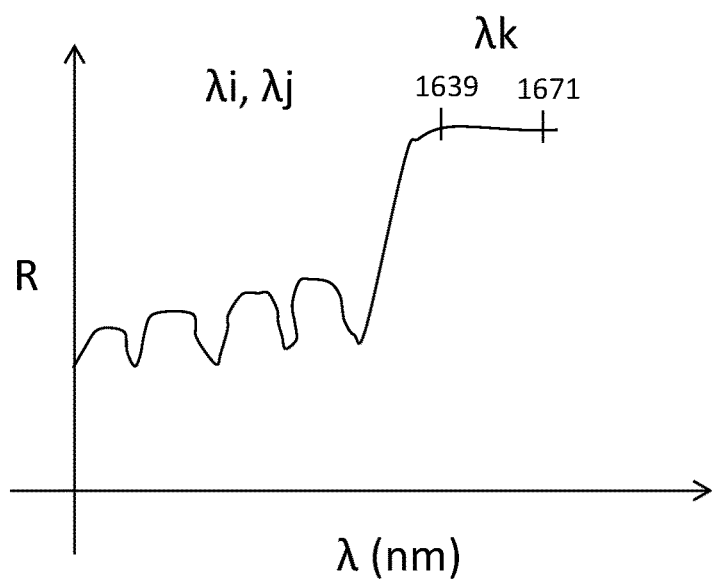
Figure 7:
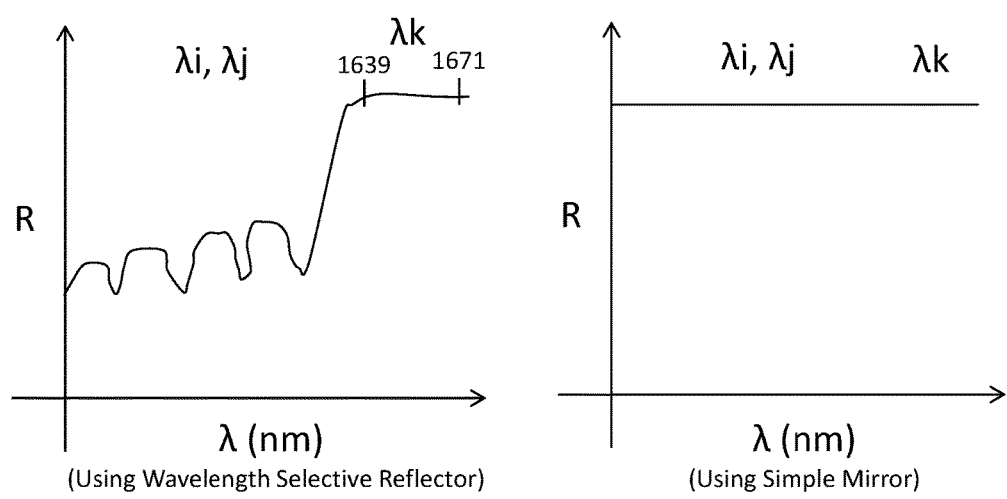
FIG. 7 shows graphs of characteristics of wavelength selective reflectors (mirrors) that may be used with the system of FIG. 5.

Graphs of transmittance versus wavelength and reflectance versus wavelength for the WDM filter 130 of FIG. 5 are shown in FIG. 6. Graphs of reflectance versus wavelength for the wavelength selective reflector 170 of FIG. 5 are shown in FIG. 7. The graph on the left of FIG. 7 shows selected wavelengths where reflectance is high and low, while the graph on the right shows where a simple mirror is used reflecting all wavelengths more or less equally. In one example, the wavelengths of λi, λj, and λk are in a range of between about 1260 nm and about 1671 nm. In this example, the wavelengths of the signals λi and λj passing through device 100 may be between about 1260 nm and about 1618 nm, while the wavelengths of the signal λk may be between about 1639 nm and about 1671 nm. The insertion loss of the device 100 for signals having wavelengths between about 1260 nm and about 1618 nm (e.g. λi and λj) passing through the device 100 may be less than about 1 dB. The signals having wavelengths between about 1639 nm and about 1671 nm (e.g., λk) exiting the device 100 at the connector 110 may be further isolated by greater than about 40 dB with respect to other signals exiting the device at the connector 110. The insertion loss of the device 100 for signals having wavelengths between about 1639 nm and about 1671 nm (e.g. λk) entering and exiting the device 100 at the connector 110 may be less than about 4 dB. The signals having wavelengths between about 1260 nm and about 1618 nm (e.g. λi, λj) exiting device 100 at the connector 150 may be further isolated with respect to λk signals by greater than about 40 dB. Signals passing through device 100 may also have a polarization dependent loss ("PDL") which may be below about 0.15 dB for the device 100. Similarly, signals passing through device 100 may have a polarization mode dispersion ("PMD") of less than about 0.2 picoseconds.

The fibers F1 extending from OLT 10 to device 100, F3 extending from device 100 to ONU 20a-d, and F2 extending from lens 120 via connector 110 to selective reflector 170 may each be, for example, angled or otherwise configured to have a return loss greater than 55 dB and may include anti-reflective coating. The fibers may be, for example, of the fiber type G.652D, G.657A1/A2 and/or G.657B2/B3. The first and second lenses 120, 140, may also be angled or otherwise configured for a return loss greater than 55 dB and may include anti-reflective coating. The mechanical connectors 110 and 150 may provide support to the fibers. As noted above, the WDM filter 130, which may take any suitable form such as a chip or filter-on-lens, may be configured to pass λi and λj signals with minimum attenuation while reflecting λk signals with minimum attenuation. Preferably the spectrum settings for λi, λj, λk are such that there is no spectral overlap among λi, λj, and λk.

For device 100, λi signals may experience an insertion loss of less than about 1 dB when passing from fiber F1 to fiber F3, λk signals may be further isolated with respect to λi signals by greater than about 50 dB from fiber F1 to fiber F3, and the return loss of both λi and λk signals may be greater than about 55 dB from fiber F1 to fiber F3. Similarly, λj signals passing from fiber F3 to fiber F1 may experience an insertion loss of less than about 1 dB. Further, signals passing from fiber F1 to and through fiber F2, and reflecting back to and through fiber F2 and then to fiber F1 may have the following properties. The insertion loss of λk signals passing from fiber F1 to and through fiber F2 to the reflector 170 may be less than about 0.5 dB, and λi signals may be further isolated with respect to λk signals by greater than about 20 dB when passing from fiber F1 to and through fiber F2 to the reflector 170. Signal λk passing from fiber F2 to reflector 170 and back to fiber F2 may experience an insertion loss less than about 3 dB, and λi signals may be further isolated with respect to λk signals greater than about 20 dB for this same optical path. It should be understood that signals which are supplied from the fiber F2 and are reflected toward fiber F2 may not be further isolated significantly if reflector 170 is a simple mirror. Further, λk signals from the reflector 170 that pass to and through fiber F2 to the fiber F1 may experience an insertion loss of less than about 0.5 dB, and λi signals may be further isolated with respect to λk signals by greater than about 20 dB for that same path. With the example described above, the total insertion loss experienced by the λk signal entering device 100 through fiber F1 and exiting the device 100 through fiber F1 may be less than about 4 dB, and the λk signal may be further isolated with respect to the λi signal for the signal exiting the device 100 at the connector 110 by greater than about 60 dB. However, as should be understood, the further isolation of the λk signal with respect to the λi signal for the signal exiting the device 100 at the connector may be less if reflector 170 is a simple mirror, and may be greater if the λi signal passes through an optional optical second filter 160 as the signals pass from fiber F1 to and through fiber F2 and then again through and from fiber F2 to fiber F1.

Figure 1:
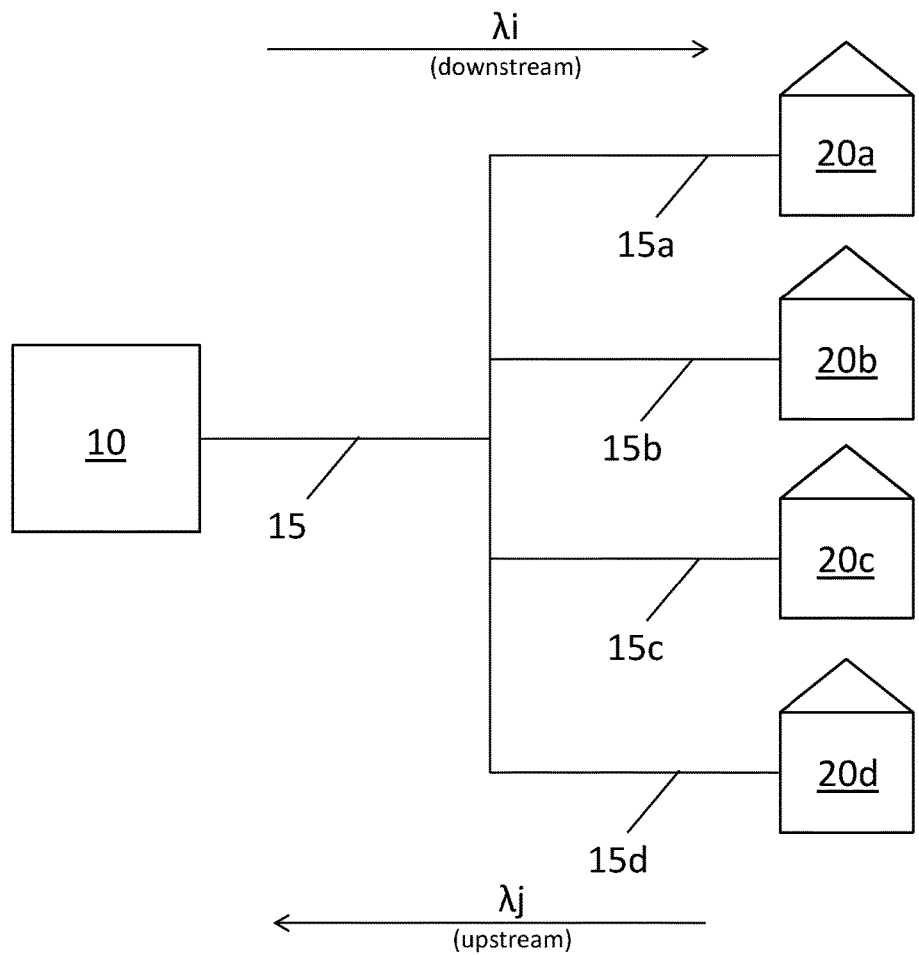
FIGS. 1-4 show optical systems according to the prior art.
Figure 2:
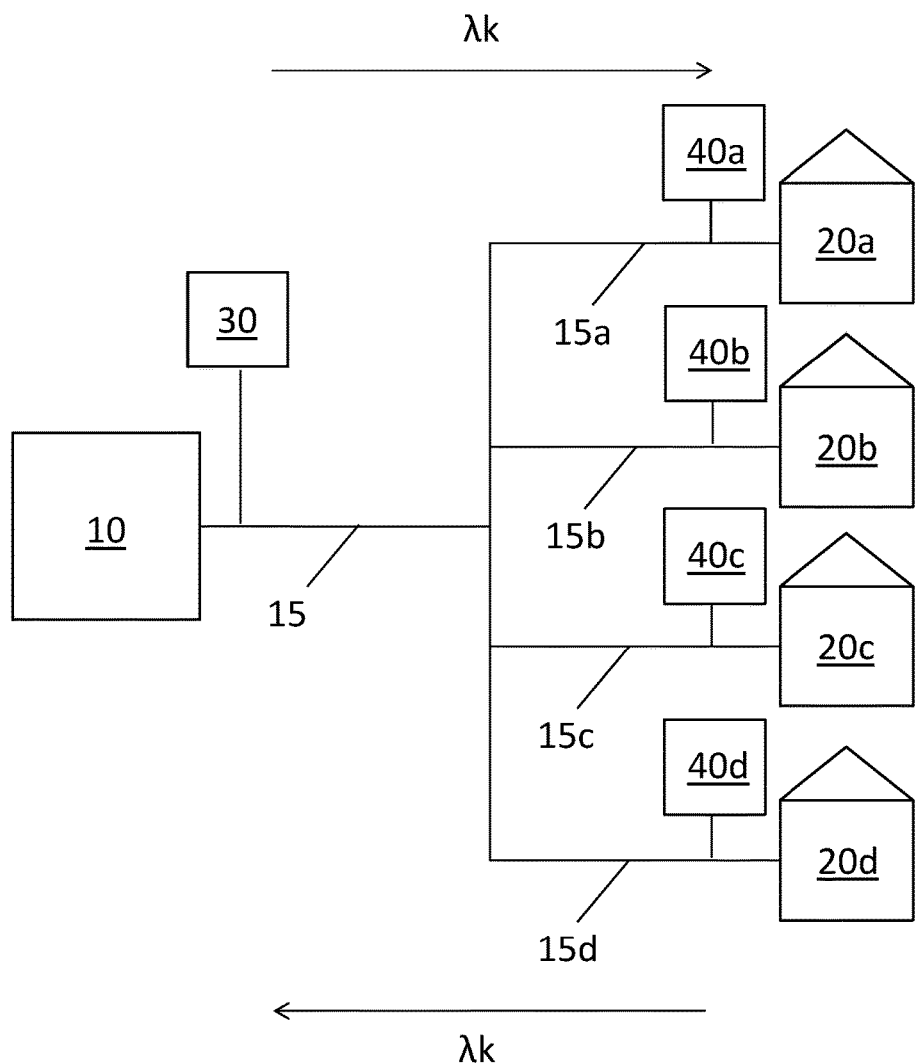
Figure 3:
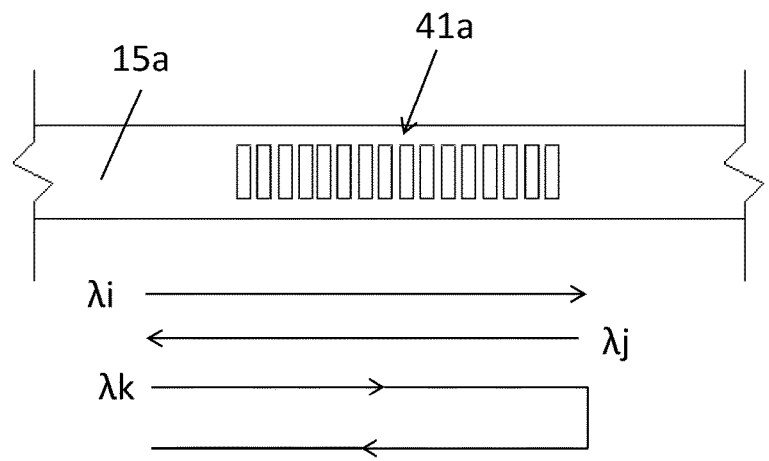
Figure 4:
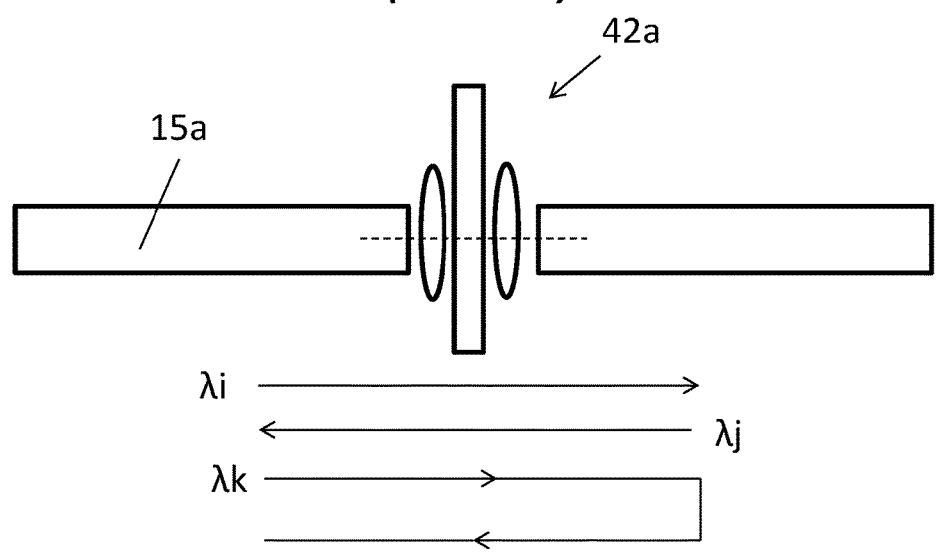

As described above, device 100 (as well as devices 200 and 300 described below) may provide for further isolation of the λk signal with respect to other signals exiting the device 100 at the connector 110 by greater than 40-60 dB, whereas the isolation of prior art systems described in connection with FIGS. 2-4 may be about 35-40 dB less than that of the technology of the disclosure. Device 100 may be provided as a single unit, for example as shown within the dashed outline of FIG. 5. In one example, device 100 may be provided within a cylindrical stainless steel housing having a diameter of less than about 3.5 mm and a length of less than about 80 mm.

In some examples, the fiber optic cables used with device 100 may have a bare fiber diameter of approximately 250 microns in a tight buffered construction with a 900 micron thick cable jacket, although other size cable jackets may be suitable, for example 1.2 mm, 2.0 mm, 2.9 mm, etc. The fibers may terminate at any suitable connector, for example SC, LC, FC, MU, ST, E2000, or any other suitable connector.

Figure 8:
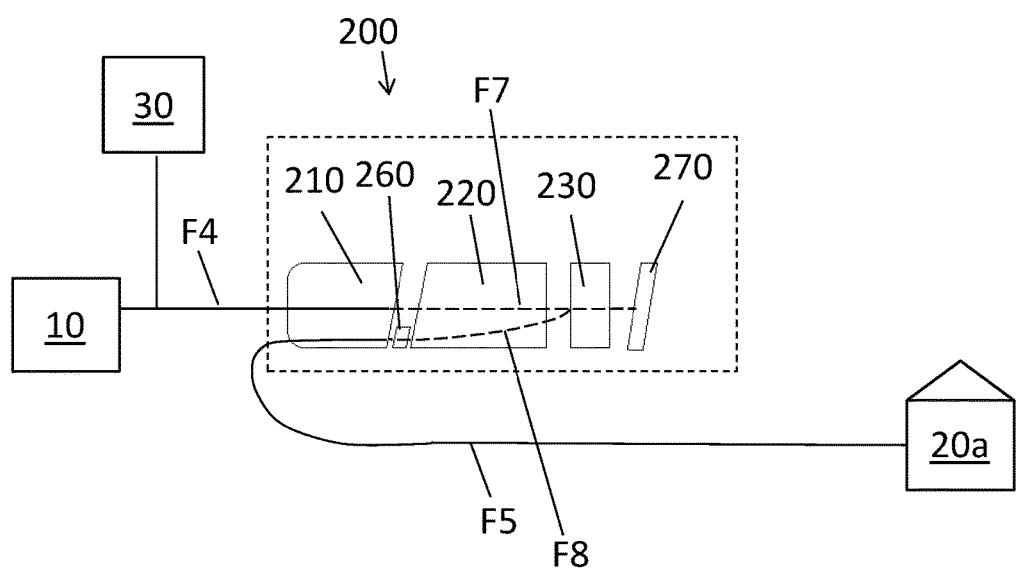
FIG. 8 is a schematic view of a system according to another embodiment of the invention.
Figure 9:
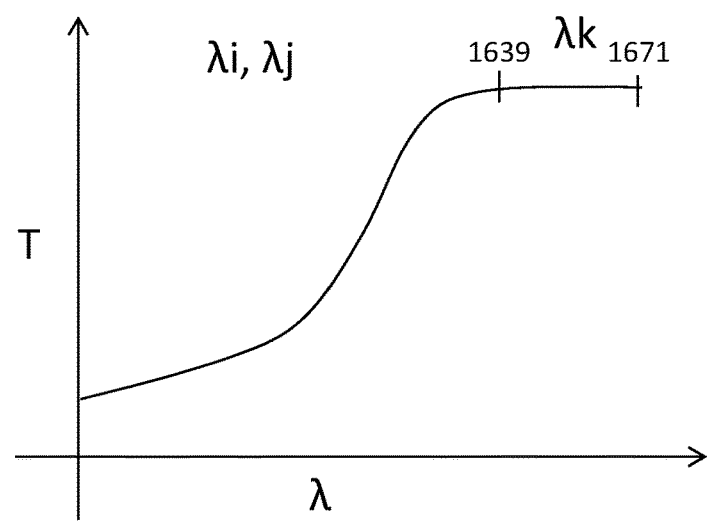
FIG. 9 shows graphs of characteristics of a WDM filter that may be used with the system of FIG. 8.
Figure 9:
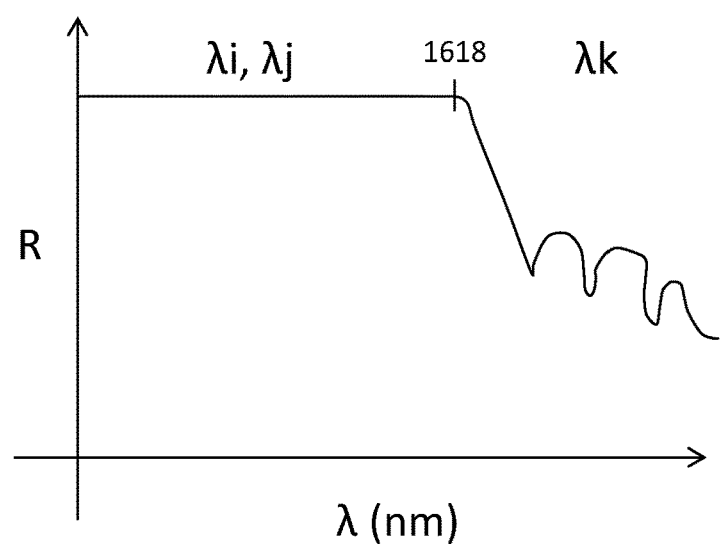

FIG. 8 shows a schematic view of another embodiment of the invention. This embodiment may be generally similar to the overall setup described above in connection with FIG. 2, and further includes a device 200 arranged in an optical pathway extending from the OLT 10 to the ONU 20a-d. The device 200 may include a mechanical connection 210 for coupling to a first fiber cable F4 extending from OLT 10, a first lens 220, a WDM filter 230, and a wavelength selective reflector 270 arranged in sequence, where the connection 210 is also for coupling to a second fiber cable F5 extending to the ONU 20a. In this case, while the wavelength selective reflector 270 may have similar characteristics to wavelength selective reflector 170 described in connection with FIG. 5, the WDM filter 230 has different characteristics than those described in connection with WDM filter 130 of FIG. 5. As shown in FIG. 9, the characteristics of transmission and reflectance of this WDM filter 230 are such that λk signals are passed through the device 200 nearly without attenuation and with minimal reflection, while λi and λj signals are reflected nearly completely with minimal attenuation and also passed with substantial attenuation. Referring again to FIG. 8, the signal from the OLT 10 may enter the device 200 via fiber cable F4 at the connection 210, pass through the lens 220 and then to the WDM filter 230 along a third optical path F7 of the device 200. At the filter 230, the λi signal is nearly completely reflected along another different fourth optical path F8 of the device 200, which fourth path F8 extends through the lens 220 and the mechanical connection 210, which is coupled to the fiber cable F5 that extends to the ONU 20a. In addition, a portion of the λi signal passes through the WDM filter 230, which substantially attenuates (e.g., about 25 dB) such λi signal portion, toward the wavelength selective reflector 270, which reflects such λi signal portion with significant attenuation of about 25 dB. This reflected λi signal portion is further significantly attenuated (about 15 dB) when passing through the WDM filter 230 after which the reflected λi signal portion travels along the optical path F7 (through the lens 220 and connector 210) and exits the device 200 through the fiber cable F4 extending to the OTDR 30. In contrast, the λk signal, which passes nearly completely through the WDM filter 230 without much attenuation, is reflected nearly completely by the wavelength selective reflector 270 without much attenuation, and such reflected λk signal passes through the WDM filter 230, without much attenuation, and then may travel along the path F4 through the lens 220 and the mechanical connection 210, where the reflected λk signal may be coupled into and be conveyed through the fiber cable F4 extending to the ODTR 30. Similar to device 100, device 200 provides that signals λi reflected toward the OTDR 30 by the device 200 are greatly attenuated in relation to the λk signal, which is reflected toward the OTDR 30 with minimal attenuation. However, the mechanisms are reversed in terms of the transmittance and reflectance of the WDM filter 230 as shown in the drawings. As with device 100, the wavelength selective reflector 270 of device 200 may be a simple mirror, or it may selectively reflect signals to help further isolate the λk signal from other signals exiting the device 200 at the fiber F4. In addition, an optional optical filter 260, having the characteristics as shown in the graphs of FIG. 6, may be positioned between lens 220 and connector 210 in the path F8 and pass λi or λj signals without significant attenuation, such as at most 1 dB, and pass λk signals with about 15 dB more attenuation than the attenuation of the λi or λj signals, to provide additional isolation of the λk signals with respect to the λi or λj signals exiting the device at the connector 210.

It should be understood that although WDM filter 230 (as well as WDM filters 130, 330) is shown as a single filter, in practice dual filters may be used in place of a single WDM filter. WDM filter 230 is aligned with respect to lens 220 to couple the optical path F7 extending from cable fiber F4 to the optical path F8 extending to cable fiber F5. In other words, WDM filter 230 is not perpendicular to the optical path coming from fiber cable F4. Reflector 270 is aligned to reflect optical signals in the optical path extending from cable fiber F4 into the same optical path and towards the cable fiber F4.

Figure 10:
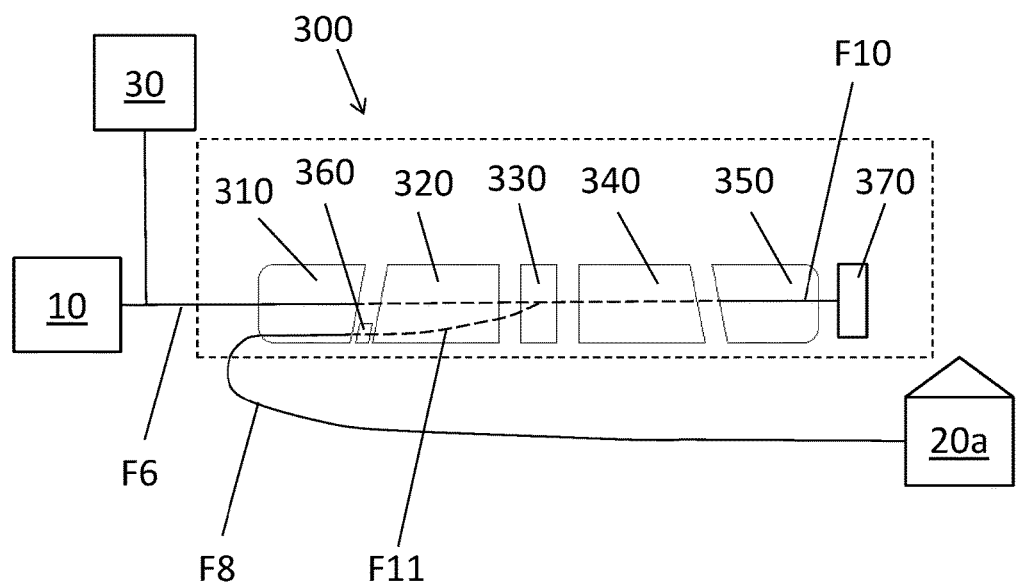
FIG. 10 is a schematic view of a system according to a further embodiment of the invention.

FIG. 10 shows a schematic view of another embodiment of the disclosure. In this embodiment, device 300 is similar to device 200 with certain variations. In particular, device 300 includes a first mechanical connector 310, first lens 320, WDM 330, and optional filter 360 in a similar configuration to device 200. However, compared to device 200, in the device 300, a second lens 340 and a second mechanical connector 350 are disposed between the wavelength selective reflector 370 and the WDM 330, arranged such that optical signals from cable fiber F6 pass through the WDM 330 to the reflector 370 through the second lens 340, the second connector 350 and cable fiber F10 extending from the connector 350 to the reflector 370 in sequence. The optical signals which pass through the WDM 330 and arrive at the reflector 370 are reflected by the reflector 370 toward the second connector 350, and such reflected signals are routed to the WDM 330 through the cable fiber F10, the second connector 350 and the second lens 340, and then along optical path F 6 through the first lens 320 and first mechanical connector 310 to the cable fiber F64 to exit the device 300 via cable fiber F6. With this configuration, λi and λj signals may be reflected without much attenuation by WDM filter 330 to exit the device 300 respectively at the fibers F8 and F6 extending to the ONT 20a and OLT 10, such that λi and λj signals pass through the device 300 to their intended destination without much attenuation. Any λi and λj signals that pass through WDM filter 330 pass through cable fiber F10 and are either reflected with significant attenuation by reflector 370 or pass through reflector 370 with significant attenuation, unless reflector 370 is a simple mirror. λk signals pass through WDM filter 330 with little attenuation and are completely or almost completely reflected by reflector 370 with minimal attenuation. To the extent any λk signals are reflected by WDM filter 330 along the path F11 extending therefrom toward cable fiber F8, additional filter 360, which has characteristics similar to filter 260, may additionally attenuate the reflected $\lambda$k signal. As with WDM filter 230, WDM filter 330 may not be perpendicular to the optical path extending from cable fiber F6, but rather arranged to reflect a signal from the fiber F6 traveling along the path of fiber F6 towards and along the optical path F11 extending to the cable fiber F8, while reflector 370 may be perpendicular to the optical path extending coextensive with the cable fiber F10.

Figure 11:
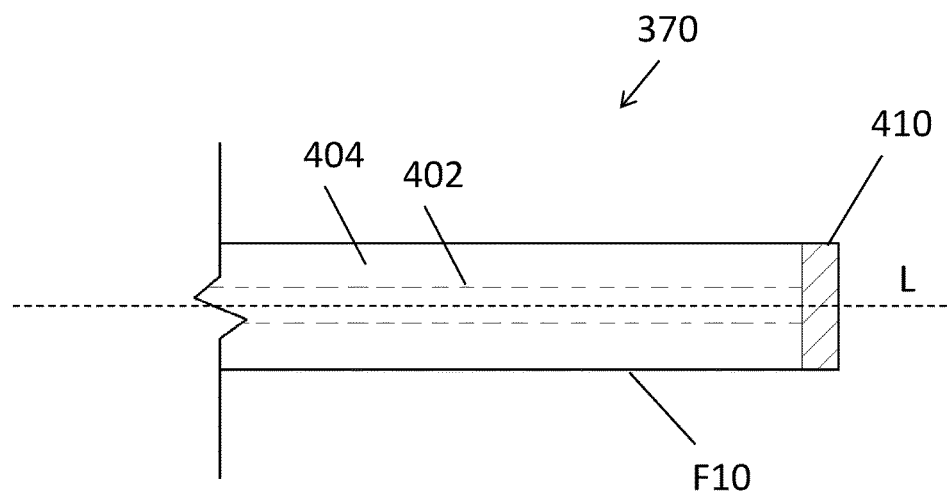
FIGS. 11-12 are diagrams of wavelength selective reflectors (mirrors) that may be used with the embodiments described herein.
Figure 12:
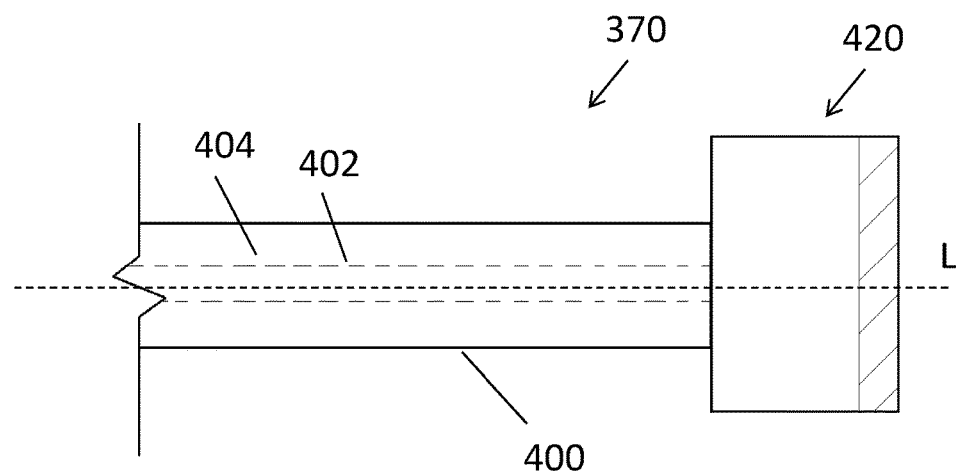

One embodiment of a structure for use as a wavelength selective reflector, such as wavelength selective reflector 370, is shown in FIG. 11. Effectively, the end of fiber cable F10 is cleaved, preferably at 90 degrees relative to a longitudinal axis L of the cable F10 along which optical signals are expected to be conveyed (along the fiber core 402 inside fiber cladding 404), and reflective material, such as that used to fabricate a mirror, is coupled, adhered, coated, or otherwise attached to the end of the cable F10 so as to form a reflective surface 410 nearly perfectly or perfectly perpendicular to the expected optical signal beam path along the axis. As in the other embodiments above, the filter mirror 410 may be a simple mirror reflecting all wavelengths including $\lambda$k signals or may be specific to reflect a signals, such as by passing $\lambda$i and $\lambda$j signals from cable F10 almost in their entirety therethrough without much attenuation and/or by reflecting a very minimal portion of the $\lambda$i and $\lambda$j signals through the fiber core 402. FIG. 12 shows another embodiment where the end of fiber cable F10 is coupled to a lens device 420, which has characteristics similar to the mirror surface 410 of FIG. 11.

Referring again to FIG. 10, first connector 310 may be, for example, a fiber capillary to provide support to cable fibers F6 and F8, with an end of first connector 310 being angled, for example about 8 degrees, and include an anti-reflective coating to reduce or eliminate reflection of $\lambda$i, $\lambda$j, and $\lambda$k signals as they exit or enter cable fibers F6 and F8. Connectors 110 and 210 may take similar forms as connector 310. Optional filter 360 may take the form of a WDM filter directly coated or adhered on first lens 320 in the optical path extending to cable fiber F8. Optional filter 360 may alternately take the form of a WDM filter directly coated or adhered on first connector 310 in the optical path extending to cable fiber F8. If optional filter 360 is used, it may also take the form of a dual WDM filter combining both examples described directly above. WDM filter 330 may take a similar form, with one filter directly coated or adhered to first lens 320, one filter directly coated or adhered to second lens 340, or both. Lenses 320 and 340 may be gradient-index ("GRIN") lenses, for example with ends facing optical paths respectively extending from the fiber cables F6 (for lens 320) and F10 (for lens 340) angled at approximately 8 degrees with little or no angle on the opposite end of the lens facing WDM filter 330. The ends of the lenses 320 and 340 may include anti-reflective coating to reduce or eliminate reflection of $\lambda$i, $\lambda$j, and $\lambda$k signals as they exit or enter the lenses.

Figure 13A:
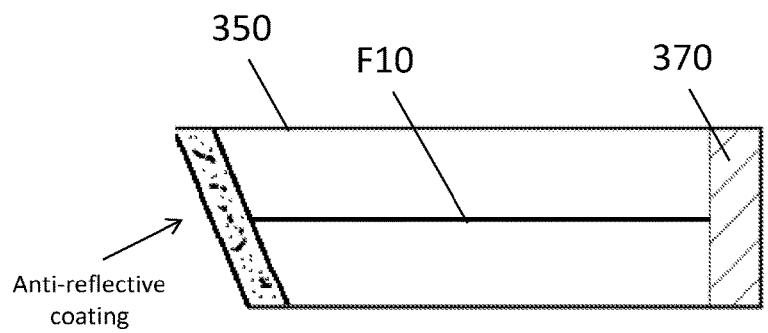
FIGS. 13A-C are schematic representations of alternative embodiments of the wavelength selective reflector of FIG. 10.
Figure 13B:
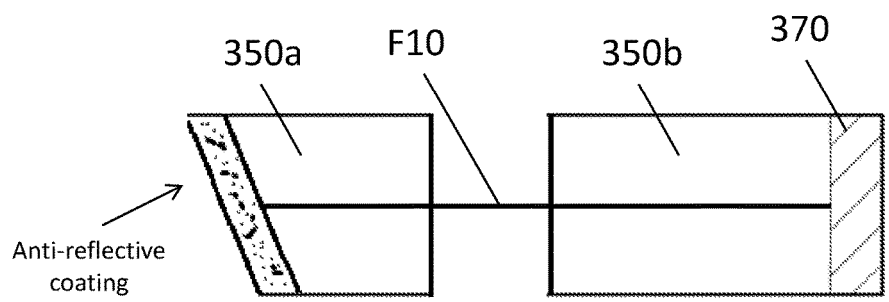
Figure 13C:
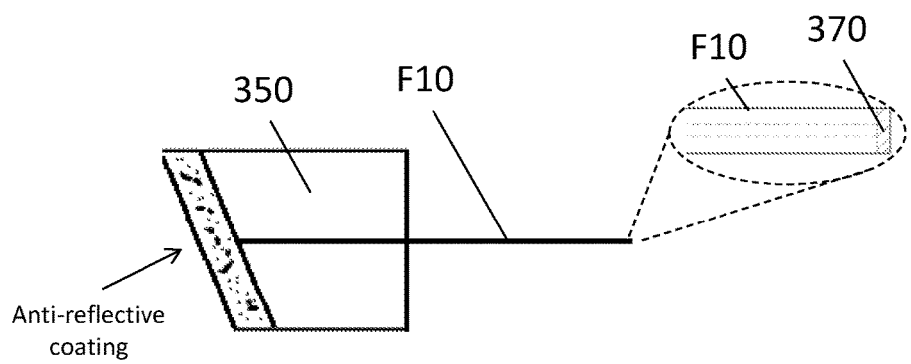

Still referring to FIG. 10, second connector 350 may be, for example, a fiber capillary to provide support to cable fiber F10, with an end of second connector 350 facing second lens 340 being angled, for example about 8 degrees, and treated with an anti-reflective coating to reduce or eliminate reflection of $\lambda$i, $\lambda$j, and $\lambda$k signals as they exit or enter cable fiber F10. The other end of second connector 350 may be perpendicular to the optical path of fiber F10 and may be treated with a filter mirror (for example by coating or adhering) so that the end of cable fiber F10 and filter mirror 370 are within or part of second connector 350, as shown in FIG. 13A. Alternately, connector 350 may be split into separate pieces. As shown in FIG. 13B, connector portion 350a may include the angled and coated surface, with fiber cable F10 extending into another connector portion 350b with the reflector 370 positioned at an end thereof. Still further, as shown in FIG. 13C, fiber cable F10 may extend beyond the end of connector 350 and the reflector applied directly to the fiber cable F10, similar to the configuration shown in FIG. 11.

Although devices 100, 200, and 300 are illustrated herein as coupling a single upstream optical fiber to a single downstream optical fiber, the devices 100, 200, and 300 may alternately couple to two or more upstream optical fibers and a corresponding number of downstream optical fibers without requiring additional lenses, filters, etc., with the only limitation being the space available in the devices 100, 200, and 300 to connect to and/or house the optical fibers. This may provide additional functionality at reduced cost by limiting the numbers of lenses and mechanical connections needed. For example, in such embodiments, additional pairs of optical fibers and optical paths may be added using capillaries or ferrules with multiple holes, where the same lens pairs is used.

Although the invention herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure.

The invention claimed is:

1. An optical signal routing device comprising:
a first lens positioned for receiving an optical signal;
a wavelength division multiplexer ("WDM") filter; and
a reflector, the WDM filter positioned between the first lens and the reflector, the WDM filter configured to pass a first portion of a signal of a first wavelength attenuated by at most a first attenuation relative to the signal of the first wavelength and reflect a second portion of the signal of the first wavelength attenuated by at least a second attenuation relative to the signal of the first wavelength, the second attenuation exceeding the first attenuation by at least a first predetermined amount, and the WDM filter being further configured to pass a third portion of a signal of a second wavelength different than the first wavelength attenuated by at least a third attenuation relative to the signal of the second wavelength and to reflect a fourth portion of the signal of the second wavelength attenuated by at most a fourth attenuation relative to the signal of the second wavelength, wherein the third attenuation exceeds the first attenuation by at least a second predetermined amount, wherein the reflector is positioned to reflect a fifth portion of the first portion of the signal of the first wavelength toward the WDM filter, in which the fifth portion is attenuated by at most a fifth attenuation relative to the first portion, wherein the third attenuation exceeds the fifth attenuation by at least a third predetermined amount.

2. The device of claim 1, wherein the first attenuation is about 1 dB, the third attenuation is about 15 dB, and the fifth attenuation is about 3 dB.

3. The device of claim 1, wherein the reflector is a mirror configured to reflect a sixth portion of the third portion of the signal of the second wavelength toward the WDM filter, in which the sixth portion is attenuated by at most a sixth attenuation relative to the third portion, the third attenuation exceeding the sixth attenuation by at least a fourth predetermined amount.

4. The device of claim 3, further comprising an optical filter positioned adjacent the first lens, the optical filter configured to pass a seventh portion of the fourth portion of the signal of the second wavelength attenuated by at most a seventh attenuation and to pass an eighth portion of the second portion of the signal of the first wavelength attenuated by at least an eighth attenuation, wherein the eighth attenuation exceeds the seventh attenuation by at least a fifth predetermined amount.

5. The device of claim 1, wherein the reflector is a wavelength selective reflector and configured to reflect a sixth portion of the third portion of the signal of the second wavelength toward the WDM filter, with at least a sixth attenuation relative to the third portion, wherein the sixth attenuation exceeds the first attenuation by at least a fourth predetermined amount.

6. The device of claim 5, further comprising an optical filter positioned adjacent the first lens, the optical filter configured to pass a seventh portion of the fourth portion of the signal of the second wavelength attenuated by at most a seventh attenuation and to pass an eighth portion of the second portion of the signal of the first wavelength attenuated by at least an eighth attenuation, wherein the eighth attenuation exceeds the seventh attenuation by a fifth predetermined amount.

7. The device of claim 1, wherein a first optical path extends through the first lens to the reflector, and a second optical path extends from the WDM filter toward and through the first lens, the first optical path being different from the second optical path.

8. The device of claim 1, further comprising a second lens positioned between the WDM filter and the reflector.

9. The device of claim 8, wherein a first optical path extends through the first and second lenses to the reflector, and a second optical path extends from the WDM filter toward and through the first lens, the first optical path being different from the second optical path.

* * * * *